United States Patent
Wang

(10) Patent No.: US 9,374,585 B2
(45) Date of Patent: Jun. 21, 2016

(54) LOW-DELAY BUFFERING MODEL IN VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 14/036,615

(22) Filed: Sep. 25, 2013

(65) Prior Publication Data

US 2014/0169448 A1 Jun. 19, 2014

Related U.S. Application Data

(60) Provisional application No. 61/739,632, filed on Dec. 19, 2012, provisional application No. 61/745,423, filed on Dec. 21, 2012.

(51) Int. Cl.
| | |
|---|---|
| H04N 7/12 | (2006.01) |
| H04N 19/115 | (2014.01) |
| H04N 19/70 | (2014.01) |
| H04N 19/146 | (2014.01) |
| H04N 19/174 | (2014.01) |
| H04N 19/42 | (2014.01) |

(Continued)

(52) U.S. Cl.
CPC .......... *H04N 19/115* (2014.11); *H04N 19/146* (2014.11); *H04N 19/174* (2014.11); *H04N 19/42* (2014.11); *H04N 19/433* (2014.11); *H04N 19/70* (2014.11); *H04N 19/172* (2014.11)

(58) Field of Classification Search
CPC ... H04N 19/70; H04N 19/115; H04N 19/174; H04N 19/433; H04N 19/146; H04N 19/42
USPC .................................................... 375/240.02
See application file for complete search history.

(56) References Cited

U.S. PATENT DOCUMENTS

| | | | | |
|---|---|---|---|---|
| 5,668,599 | A * | 9/1997 | Cheney et al. | 375/240.15 |
| 6,026,198 | A * | 2/2000 | Okada | 382/247 |
| 6,539,058 | B1 * | 3/2003 | Pearlstein et al. | 375/240.25 |

(Continued)

FOREIGN PATENT DOCUMENTS

TW 201215150 A 4/2012

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — Shan Elahi
(74) *Attorney, Agent, or Firm* — Shumaker & Sieffert, P.A.

(57) ABSTRACT

Techniques for low-delay buffering in a video coding process are disclosed. Video decoding techniques may include receiving a first decoded picture buffer (DPB) output delay and a second DPB output delay for a decoded picture, determining, for the decoded picture, a first DPB output time using the first DPB output delay in the case a hypothetical reference decoder (HRD) setting for a video decoder indicates operation at a picture level, and determining, for the decoded picture, a second DPB output time using the second DPB output delay in the case that the HRD setting for the video decoder indicates operation at a sub-picture level.

24 Claims, 6 Drawing Sheets

(51) Int. Cl.
*H04N 19/433* (2014.01)
*H04N 19/172* (2014.01)

(56) References Cited

U.S. PATENT DOCUMENTS

| | | | |
|---|---|---|---|
| 7,395,345 B2* | 7/2008 | Fallon | 709/231 |
| 7,400,274 B2* | 7/2008 | Fallon et al. | 341/51 |
| 8,692,695 B2* | 4/2014 | Fallon et al. | 341/51 |
| 9,179,149 B2 | 11/2015 | Kitahara et al. | |
| 2004/0005007 A1* | 1/2004 | Viscito | H04N 21/23406 375/240.25 |
| 2004/0101284 A1* | 5/2004 | Ando | 386/95 |
| 2004/0218816 A1* | 11/2004 | Hannuksela | H04N 19/159 382/232 |
| 2005/0254575 A1* | 11/2005 | Hannuksela | H04N 19/70 375/240.1 |
| 2006/0053004 A1* | 3/2006 | Ceperkovic et al. | 704/221 |
| 2006/0120463 A1* | 6/2006 | Wang | 375/240.25 |
| 2006/0120643 A1* | 6/2006 | Kurimura et al. | 384/119 |
| 2008/0159636 A1* | 7/2008 | Maruyama et al. | 382/232 |
| 2009/0086816 A1* | 4/2009 | Leontaris | H04N 19/176 375/240.03 |
| 2009/0109988 A1 | 4/2009 | Musunuri et al. | |
| 2009/0190666 A1* | 7/2009 | Viscito et al. | 375/240.25 |
| 2009/0296808 A1* | 12/2009 | Regunathan et al. | 375/240.03 |
| 2010/0054329 A1* | 3/2010 | Bronstein et al. | 375/240.03 |
| 2010/0091837 A1* | 4/2010 | Zhu | H04N 19/70 375/240.01 |
| 2010/0150230 A1* | 6/2010 | Zhou et al. | 375/240.12 |
| 2010/0208796 A1* | 8/2010 | Luo | H04N 19/597 375/240.02 |
| 2010/0246662 A1 | 9/2010 | Koto et al. | |
| 2012/0140825 A1* | 6/2012 | Huang et al. | 375/240.15 |
| 2013/0003864 A1 | 1/2013 | Sullivan | |
| 2013/0051456 A1* | 2/2013 | Kitahara et al. | 375/240.02 |
| 2013/0051458 A1* | 2/2013 | Kitahara et al. | 375/240.03 |
| 2013/0117270 A1* | 5/2013 | Sullivan et al. | 707/740 |
| 2013/0170561 A1* | 7/2013 | Hannuksela | 375/240.25 |
| 2013/0235152 A1* | 9/2013 | Hannuksela et al. | 348/43 |
| 2013/0266076 A1* | 10/2013 | Wang et al. | 375/240.25 |
| 2014/0003534 A1* | 1/2014 | Haque | H04N 19/597 375/240.25 |
| 2014/0016708 A1* | 1/2014 | Wang | 375/240.25 |
| 2014/0022343 A1* | 1/2014 | Chen | 348/43 |
| 2014/0023138 A1* | 1/2014 | Chen | 375/240.12 |
| 2014/0079140 A1* | 3/2014 | Wang | 375/240.26 |
| 2014/0086336 A1* | 3/2014 | Wang | 375/240.26 |
| 2014/0086337 A1* | 3/2014 | Wang | 375/240.26 |
| 2014/0086344 A1* | 3/2014 | Wang | 375/240.28 |
| 2014/0092994 A1* | 4/2014 | Wang | 375/240.26 |
| 2014/0098896 A1* | 4/2014 | Wang | 375/240.26 |
| 2014/0119439 A1* | 5/2014 | Guo et al. | 375/240.12 |
| 2014/0169448 A1* | 6/2014 | Wang | 375/240.02 |
| 2014/0192149 A1* | 7/2014 | Wang et al. | 348/43 |
| 2014/0192882 A1* | 7/2014 | Wang et al. | 375/240.16 |
| 2014/0192895 A1* | 7/2014 | Chen et al. | 375/240.25 |
| 2014/0192903 A1* | 7/2014 | Wang | 375/240.28 |
| 2014/0355692 A1* | 12/2014 | Ramasubramonian et al. | 375/240.26 |
| 2015/0103888 A1* | 4/2015 | Chen et al. | 375/240.02 |
| 2015/0103921 A1* | 4/2015 | Hannuksela | 375/240.26 |
| 2015/0208095 A1* | 7/2015 | Schierl et al. | |

OTHER PUBLICATIONS

Bross et al. "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v9, 12th Meeting: Geneva, CH, Jan. 14-23, 2013, 332 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Deshpande et al., "An Improved Hypothetical Reference Decoder for HEVC," Proc. SPIE 8666, Visual Information Processing and Communication IV, vol. 8666, Feb. 21, 2013, 9 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

International Search Report and Written Opinion from International Application No. PCT/US2013/074104, dated Mar. 24, 2014, 15 pp.

Kazui K., et al., "AHG9: Improvement of HRD for sub-picture based operation", JCT-VC Meeting; MPEG Meeting; Nov. 7, 2012-Jul. 20, 2012; Stockholm; (Joint Collaborative Team on Video Coding of ISO/IEC JTC1/SC29/WG11 and ITU-T SG.16 ); URL: http://wftp3.itu.int/av-arch/jctvc-Site/, No. JCTVC-J0136, JulyXP030112498, sections 4.1, 4.2; figure 5, 10 pp.

Wang, et al., "AHG9: HEVC HRD Cleanups," 12th Meeting, Geneva, CH, Jan. 14-23, 2013, 4 pp.

Wang, et al., "Sub-picture-level low-delay CPB behavior," 9th Meeting, Geneva, CH, Apr. 27-May 7, 2012, 3 pp.

Li, et al., "Proposed updates to PDAM4—Transport of HEVC video over MPEG-2 Systems," Apr. 2013, 18 pp.

Bross B., et al., "High Efficiency Video Coding (HEVC) text specification draft 9," JCT-VC 11th Meeting, Oct. 19, 2012, K1003_v1, pp. 232-238, Sections C.2.2 and C.3.2. (8 pages).

Taiwan Office Action and Search Report—TW102147297—TIPO—Oct. 1,2015 (11 pages) including translation.

* cited by examiner

LOW-DELAY BUFFERING MODEL IN VIDEO CODING

RELATED APPLICATIONS

This application claims the benefit of U.S. Provisional Application No. 61/739,632 filed Dec. 19, 2012, and U.S. Provisional Application No. 61/745,423, filed Dec. 21, 2012, the entire content of both which is incorporated by reference herein.

TECHNICAL FIELD

This disclosure relates to video coding, and more particularly to techniques for low-delay buffering in a video coding process.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction utilizes a predictive block. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for video coding, and more particularly techniques for low-delay buffering in a video coding process. In one or more examples, this disclosure proposes techniques for signaling decoded picture buffer (DPB) output delays to be used when a video decoder is operating at a sub-picture level, so as to improve video buffer delay.

In one example of the disclosure, a method of decoding video comprises receiving a first decoded picture buffer (DPB) output delay and a second DPB output delay for a decoded picture, determining, for the decoded picture, a first DPB output time using the first DPB output delay in the case a hypothetical reference decoder (HRD) setting for a video decoder indicates operation at a picture level, and determining, for the decoded picture, a second DPB output time using the second DPB output delay in the case that the HRD setting for the video decoder indicates operation at a sub-picture level.

In another example of the disclosure, a method of encoding video comprises determining a first DPB output time using a first DPB output delay in the case an HRD setting for a video decoder indicates operation at a picture level, determining a second DPB output time using a second DPB output delay in the case that the HRD setting for the video decoder indicates operation at a sub-picture level, and signaling the first decoded picture buffer (DPB) output delay and the second DPB output delay.

In another example of the disclosure, an apparatus configured to decode video data comprises a video decoder configured to receive a first DPB output delay and a second DPB output delay for a decoded picture, determine, for the decoded picture, a first DPB output time using the first DPB output delay in the case an HRD setting for a video decoder indicates operation at a picture level, and determine, for the decoded picture, a second DPB output time using the second DPB output delay in the case that the HRD setting for the video decoder indicates operation at a sub-picture level.

In another example of the disclosure, an apparatus configured to encode video data comprises a video encoder configured to determine a first DPB output time using a first DPB output delay in the case an HRD setting for a video decoder indicates operation at a picture level, determine a second DPB output time using a second DPB output delay in the case that the HRD setting for the video decoder indicates operation at a sub-picture level, and signal the first DPB output delay and the second DPB output delay.

In another example of the disclosure, an apparatus configured to decode video data comprises means for receiving a first DPB output delay and a second DPB output delay for a decoded picture, means for determining, for the decoded picture, a first DPB output time using the first DPB output delay in the case an HRD setting for a video decoder indicates operation at a picture level, and means for determining, for the decoded picture, a second DPB output time using the second DPB output delay in the case that the HRD setting for the video decoder indicates operation at a sub-picture level.

In another example of the disclosure, an apparatus configured to encode video data comprises means for determining a first DPB output time using a first DPB output delay in the case an HRD setting for a video decoder indicates operation at a picture level, means for determining a second DPB output time using a second DPB output delay in the case that the HRD setting for the video decoder indicates operation at a sub-picture level, means for signaling the first DPB output delay and the second DPB output delay.

In another example, this disclosure discloses a computer-readable storage medium storing instructions that, when executed, cause one or more processors of a device configured to decode video data to receive a first DPB output delay and a second DPB output delay for a decoded picture, determine, for the decoded picture, a first DPB output time using the first DPB output delay in the case an HRD setting for a video decoder indicates operation at a picture level, and determine, for the decoded picture, a second DPB output time using the second DPB output delay in the case that the HRD setting for the video decoder indicates operation at a sub-picture level.

In another example, this disclosure discloses a computer-readable storage medium storing instructions that, when executed, cause one or more processors of a device configured to encode video data to determine a first DPB output time using a first DPB output delay in the case an HRD setting for a video decoder indicates operation at a picture level, determine a second DPB output time using a second DPB output delay in the case that the HRD setting for the video decoder indicates operation at a sub-picture level, and signal the first DPB output delay and the second DPB output delay.

The details of one or more examples are set forth in the accompanying drawings and the description below. Other features, objects, and advantages will be apparent from the description and drawings, and from the claims.

DETAILED DESCRIPTION

This disclosure describes various methods and techniques to achieve reduced codec (coder/decoder) delay in an interoperable manner, through a generic sub-picture based hypothetical reference decoder (HRD) model that includes both sub-picture based coded picture buffer (CPB) operations and sub-picture timing based decoded picture buffer (DPB) operations.

Current approaches to minimizing CPB and/or DPB delay time exhibit the following drawbacks. The output time of a decoded picture is equal to the decoding time (i.e., CPB removal time) of the last decoding unit (i.e., the access unit itself for access unit-level operation) plus the signaled DPB output delay. Thus, two approaches to reduce the delay are generally used. One is to shift the decoding time earlier. The other is to reduce the value of the signaled DPB output delay (relative to the CPB removal time). However, existing solutions for an ultra-low delay buffering model only involve sub-picture based CPB operations, and only take advantage of the first approach to reduce the delay.

In view of these drawbacks, this disclosure proposes techniques for further reducing decoding delay through the signaling and use of reduced values of the signaled DPB output delay relative to the CPB removal time.

Figure 1:
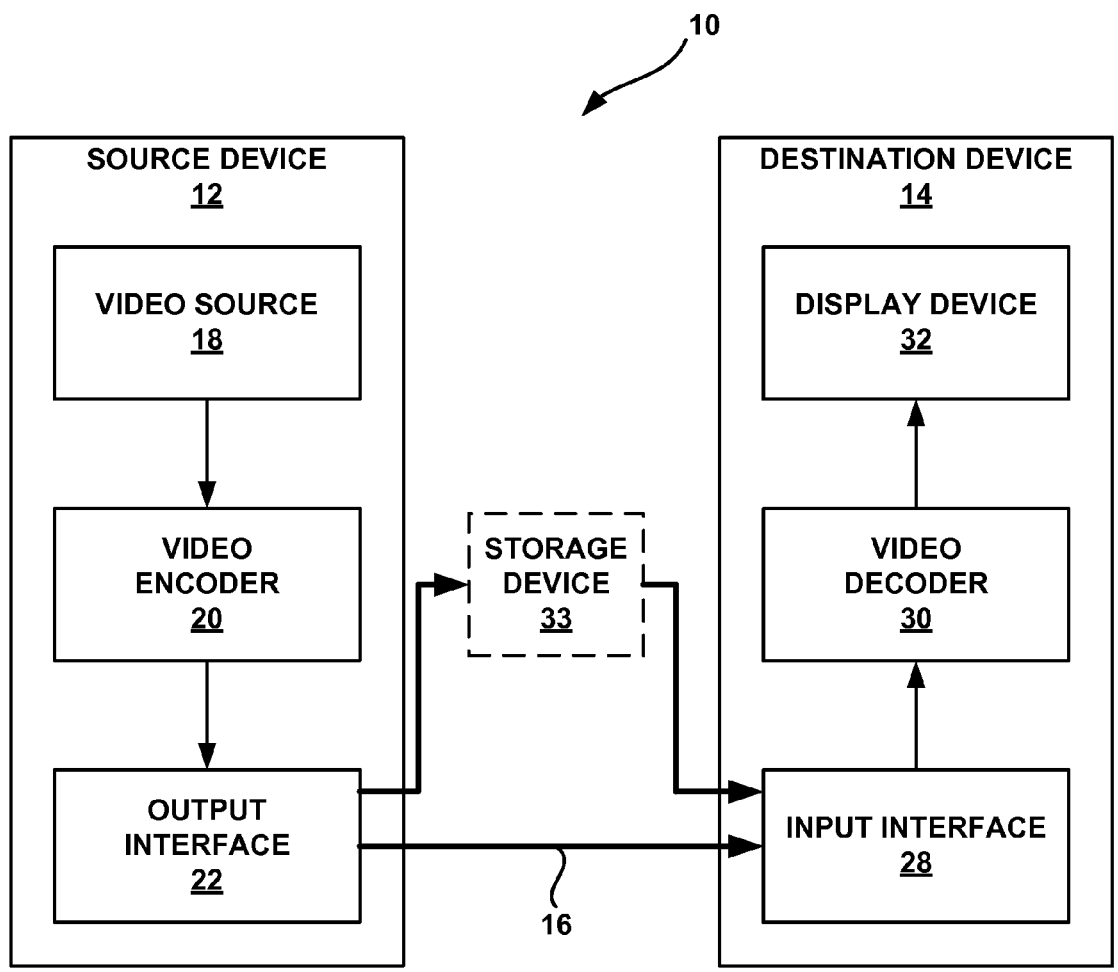
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 33. Similarly, encoded data may be accessed from storage device 33 by input interface. Storage device 33 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 may correspond to a file server or another intermediate storage device that may hold the encoded video generated by source device 12. Destination device 14 may access stored video data from storage device 33 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 33 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 33, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). HEVC is being developed by the Joint Collaboration Team on Video Coding (JCT-VC) of ITU-T Video Coding Experts Group (VCEG) and ISO/IEC Motion Picture Experts Group (MPEG). One Working Draft (WD) of HEVC, Bross, et al., "High Efficiency Video Coding (HEVC) text specification draft 9," and referred to as HEVC WD9 hereinafter, is available, as of Jul. 5, 2013, from http://phenix.int-evry.fr/jct/doc_end_user/documents/11_Shanghai/wg11/JCTVC-K1003-v13.zip. The entire content of HEVC WD9 is incorporated by reference herein.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU generally corresponds to a size of the coding node and must typically be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video applications that may make use of video encoder 20 and video decoder 30 may include local playback, streaming, broadcast/multicast and conversational applications. Conversational applications include video telephony and video conferencing. Conversational applications are also referred to as low-delay applications, in that such real-time applications are not tolerant to significant delay. For a good user experience, conversational applications require a relatively low end-to-end delay of the entire systems, i.e., the delay between the time when a video frame is captured at a source device and the time when the video frame is displayed at a destination device. Typically, an acceptable end-to-end delay for conversational applications should be less than 400 ms. An end-to-end delay of around 150 ms is considered very good.

Each processing step of a conversational application may contribute to the overall end-to-end delay. Example delays from processing steps includes capturing delay, pre-processing delay, encoding delay, transmission delay, reception buffering delay (for de-jittering), decoding delay, decoded picture output delay, post-processing delay, and display delay. Typically, the codec delay (encoding delay, decoding delay and decoded picture output delay) is targeted to be minimized in conversational applications. In particular, the coding structure should ensure that the pictures' decoding order and output order are identical such that the decoded picture output delay is equal to or close to zero.

Video coding standards typically include a specification of a video buffering model. In AVC and HEVC, the buffering model is referred to as a hypothetical reference decoder (HRD), which includes a buffering model of both the coded picture buffer (CPB) and the decoded picture buffer (DPB). A CPB is a first-in first-out buffer containing coded pictures for decoding. A DPB is a buffer holding decoded pictures for use in reference (e.g., inter-prediction), output reordering, output delay, and eventual display. The CPB and DPB behaviors are mathematically specified by the HRD. The HRD directly imposes constraints on different timing, buffer sizes and bit rates, and indirectly imposes constraints on bitstream characteristics and statistics. A complete set of HRD parameters includes five basic parameters: initial CPB removal delay, CPB size, bit rate, initial DPB output delay, and DPB size.

In AVC and HEVC, bitstream conformance and decoder conformance are specified as parts of the HRD specification. Though the HRD is referred to as a decoder, some techniques specified by the HRD are also typically needed at the encoder side to guarantee bitstream conformance, while typically not needed at the decoder side. Two types of bitstream or HRD conformance, namely Type I and Type II, are specified. Also, two types of decoder conformance (i.e., output timing decoder conformance and output order decoder conformance) are specified.

A Type I bitstream, is a network abstraction layer (NAL) unit stream containing only the video coding layer (VCL) NAL units and NAL units with nal_unit_type equal to FD_NUT (filler data NAL units) for all access units in the bitstream. A Type II bitstream, contains, in addition to the VCL NAL units and filler data NAL units for all access units in the bitstream, at least one of the following: additional non-VCL NAL units other than filler data NAL units, all leading zero 8 bits, zero byte, start_code_prefix_one_3 bytes, and trailing_zero_8 bits syntax elements that form a byte stream from the NAL unit stream.

Figure 2:
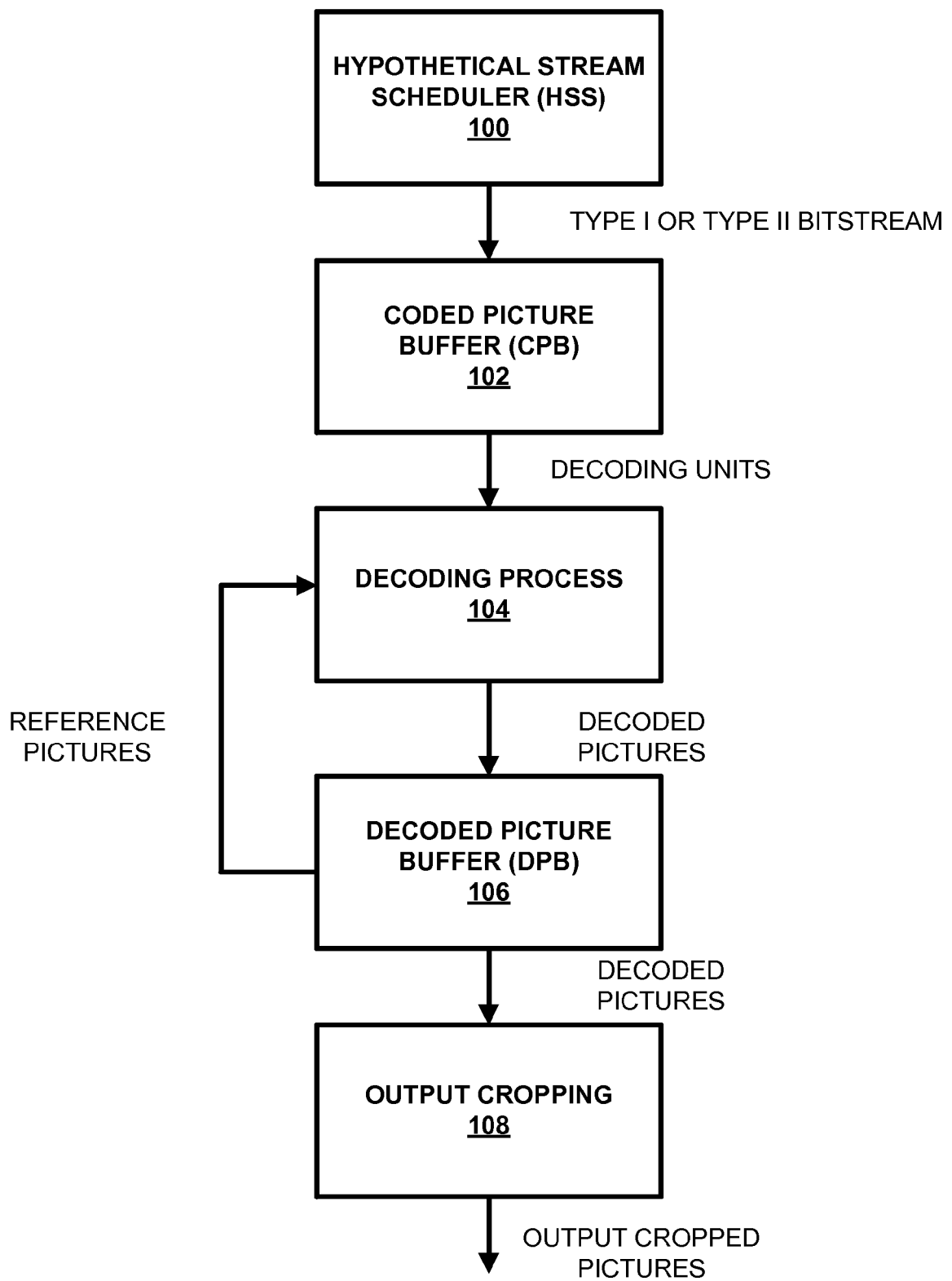
FIG. 2 is a block diagram illustrating a buffer model for a hypothetical reference decoder (HRD).

FIG. 2 is a block diagram illustrating a buffer model for a hypothetical reference decoder (HRD). The HRD operates as follows. Data associated with decoding units that flow into CPB 102 according to a specified arrival schedule are delivered by the hypothetical stream scheduler (HSS) 100. The streams delivered by HSS 100 may be Type I or Type II bitstreams, as defined above. The data associated with each decoding unit are removed and decoded by decoding process 104 (e.g., by video decoder 30) at the CPB removal time of the decoding unit. Decoding process 104 is performed by video decoder 30. Each decoded picture produced by decoding process 104 is placed in DPB 106. The decoded pictures may be used as reference pictures during decoding process 104 (e.g., during inter-prediction). A decoded picture is removed from DPB 106 when it becomes no longer needed for inter-prediction reference and no longer needed for output. In some examples, decoded pictures in DPB 106 may be cropped by output cropping unit 108 before being displayed. Output cropping unit 108 may be part of video decoder 30 or may be part of external processor (e.g., a display processor) configured to further process the output of a video decoder.

In the AVC and HEVC HRD models, decoding or CPB removal is access unit (AU) based, and it is assumed that picture decoding is instantaneous (e.g., decoding process 104 in FIG. 2 is assumed to be instantaneous). An access unit is a set of network abstract layer (NAL) units and contains one coded picture. In practical applications, if a conforming decoder strictly follows the decoding times signaled, e.g., in picture timing supplemental enhancement information (SEI) messages generated by video encoder 20, to start decoding of AUs, then the earliest possible time to output a particular decoded picture is equal to the decoding time of that particular picture (i.e., the time when a picture starts to be decoded) plus the time needed for decoding that particular picture. The time needed for decoding a picture in the real-world cannot be equal to zero.

HEVC WD9 includes the support of sub-picture based CPB operations to enable reduced codec delay, sometimes referred to as ultra-low delay. The CPB may operate at either the AU level (i.e., picture level) or sub-picture level (i.e., less than an entire picture), depending on whether sub-picture level CPB operation is preferred by a decoder (which may be specified by an external means not specified in the HEVC specification) and whether sub-picture CPB parameters are present (in the bitstream or through external means not specified in the HEVC spec). When both conditions are true, the CPB operates at a sub-picture level (and in this case each decoding unit is defined as a subset of an AU). A decoding unit (DU) is the unit operated on by the decoder. Otherwise, the CPB operates at AU level (and in this case each decoding unit is defined as an AU). A DU is equal to an AU if the syntax element SubPicCpbFlag is equal to 0. The DU is a subset of an AU otherwise.

HEVC syntax for sub-picture level CPB parameters includes the following:
  The following syntax is in the video usability information
    (VUI) part of the sequence parameter set (SPS)
    Whether sub-picture level CPB parameters are present
    A tick divisor, for derivation of the sub tick clock
    CPB removal delay length
    Whether decoding unit CPB removal delay values are
      signaled in picture timing SEI messages or decoding
      unit information SEI messages
    Length of CPB size values for CPB operations at sub-picture level
  The following syntax is in buffering period SEI messages
    A set of initial CPB removal delay and delay offset for
      sub-picture level CPB operations
  The following syntax is in picture timing SEI messages
    The number of decoding units in an access unit
    The number of NAL units in each decoding unit
    The decoding unit CPB removal delay values for the
      decoding units The following syntax is in picture timing SEI messages
The index of each decoding unit to the list of decoding units in an access unit
The decoding unit CPB removal delay value for each decoding unit Current approaches to minimizing CPB and/or DPB delay time exhibit the following drawbacks. The output time of a decoded picture is equal to the decoding time (i.e., CPB removal time) of the last DU (i.e., the AU itself for AU-level operation) plus the signaled DPB output delay. Thus, two approaches to reduce the delay are generally used. One is to shift the decoding time earlier. The other is to reduce the value of the signaled DPB output delay (relative to the CPB removal time). However, existing solutions for an ultra-low delay buffering model only involve sub-picture based CPB operations, and only take advantage of the first approach to reduce the delay.

In view of these drawbacks, this disclosure proposes techniques for further reducing decoding delay through the signaling and use of reduced values of the signaled DPB output delay relative to the CPB removal time.

Specifically, in one example of the disclosure, one additional signaled value of DPB output delay relative to the CPB removal time of each AU is signaled by an encoder, e.g., in the picture timing SEI message. This additional signaled DPB output delay is used in the derivation of the DPB output time for sub-picture based HRD operations. In another example, in addition to the additionally signaled DPB output delay, DPB output times are derived using a sub tick clock instead of the tick clock.

Some detailed examples are provided in below. If not specifically mentioned, the aspects of the following examples may operate as defined in HEVC WD9.

An example syntax and semantics of the picture timing SEI message, according to one example of this disclosure are as follows. Syntax elements altered or introduced by this disclosure are shown in bold.

| pic_timing( payloadSize ) { | Descriptor |
|---|---|
| if( frame_field_info_present_flag ) { | |
|   pic_struct | u(4) |
|   progressive_source_idc | u(2) |
|   duplicate_flag | u(1) |
| } | |
| au_cpb_removal_delay_minus1 | u(v) |
| pic_dpb_output_delay | u(v) |
| if( sub_pic_cpb_params_present_flag ) | |
|   pic_dpb_outupt_du_delay | u(v) |
| if( sub_pic_cpb_params_present_flag && | |
|   sub_pic_cpb_params_in_pic_timing_sei_flag ) { | |
|   num_decoding_units_minus1 | ue(v) |
|   du_common_cpb_removal_delay_flag | u(1) |
|   if( du_common_cpb_removal_delay_flag ) | |
|     du_common_cpb_removal_delay_minus1 | u(v) |
|   for( i = 0; i <= num_decoding_units_minus1; i++ ) { | |
|     num_nalus_in_du_minus1[ i ] | ue(v) |
|     if( !du_common_cpb_removal_delay_flag && | |
|       i < num_decoding_units_minus1 ) | |
|       du_cpb_removal_delay_minus1[ i ] | u(v) |
|   } | |
| } | |
| } | |

In this example of the disclosure, the bolded syntax elements may operate as follows. The sytnax element pic_dpb_output_du_delay is used to compute the DPB output time of the picture when the HRD operates at a sub-picture level (i.e., when SubPicCpbFlag is equal to 1). The syntax element pic_dpb_output_du_delay specifies how many sub clock ticks to wait after removal of the last decoding unit in an access unit from the CPB before the decoded picture is output from the DPB.

In one example, the length of the syntax element pic_dpb_output_du_delay is given in bits by dpb_output_delay_length_minus1+1. In another example, the length of the syntax element pic_dpb_output_du_delay is given in bits by the value of another syntax element plus 1, where, e.g., the syntax element is named dpb_output_delay_length_du_minus1 and signaled in the VUI part of the sequence parameter set.

The output time derived from pic_dpb_output_du_delay of any picture that is output from an output timing conforming decoder shall precede the output time derived from the pic_dpb_output_du_delay of all pictures in any subsequent coded video sequence in decoding order. In one example, the picture output order established by the values of this syntax element shall be the same order as established by the values of the syntax element PicOrderCntVal, as is specified in HEVC WD9. The syntax element PicOrderCntVal indicates the picture order count (POC) of the current picture. A POC value is a variable that is associated with each picture to be output from the DPB that indicates the position of the associated picture in output order relative to the output order positions of the other pictures to be output from the DPB in the same coded video sequence.

For pictures that are not output by the "bumping" process (i.e., the process by which pictures are removed from the DPB) because they precede, in decoding order, an instantaneous decoding refresh (IDR) or broken link access (BLA) picture with no_output_of_prior_pics_flag equal to 1 or inferred to be equal to 1, the output times derived from pic_dpb_output_du_delay shall be increasing with increasing value of PicOrderCntVal relative to all pictures within the same coded video sequence. The syntax element no_output_of_prior_pics_flag specifies how previously-decoded pictures in the DPB are treated after decoding of an IDR or a BLA picture. If no_output_of_prior_pics_flag is equal to or inferred to be 1, after decoding an IDR or BLA picture, those previously-decoded pictures would not be output, but would be directly flushed/removed from the decoded picture buffer (DPB).

The "bumping" process is invoked in the following cases.
The current picture is an IDR or a BLA picture and no_output_of_prior_pics_flag is not equal to 1 and is not inferred to be equal to 1.
The current picture is neither an IDR picture nor a BLA picture, and the number of pictures in the DPB that are marked as "needed for output" is greater than the maximum number of picture allowed preceding any picture in decoding order (sps_max_num_reorder_pics [HighestTid]).
The current picture is neither an IDR picture nor a BLA picture, and the number of pictures in the DPB is equal to the maximum required size of the DPB in unit of picture storage buffers (sps_max_dec_pic_buffering [HighestTid]).

The "bumping" process includes the following ordered steps:
1. The picture that is first for output is selected as the one having the smallest value of PicOrderCntVal of all pictures in the DPB marked as "needed for output."
2. The picture is cropped, using the conformance cropping window specified in the active sequence parameter set for the picture, the cropped picture is output, and the picture is marked as "not needed for output."

3. If the picture storage buffer that included the picture that was cropped and output contains a picture marked as "unused for reference", the picture storage buffer is emptied. That is, if a picture has been output for display and is no longer needed for inter-prediction it may be "bumped," i.e., removed from the DPB.

For any two pictures in the coded video sequence, the difference between the output times of the two pictures derived under sub-picture-level HRD operations shall be identical to the same difference derived under AU-level (i.e., picture level) HRD operations.

An example picture output process is as follows. The following happens instantaneously at the CPB removal time of access unit n, $t_r(n)$. Based on whether or not a picture n has PicOutputFlag equal to 1 (i.e., sub-picture HRD is used), its DPB output time $t_{o,dpb}(n)$ is derived by the following equation:

if(!SubPicCpbFlag)// i.e. the HRD operates at AU level $$t_{o,dpb}(n)=t_r(n)+t_c*\text{pic\_dpb\_output\_delay}(n)$$

else// i.e. the HRD operates at sub-picture level $$t_{o,dpb}(n)=t_r(n)+t_{c\_sub}*\text{pic\_dpb\_output\_du\_delay}(n)$$

where pic_dpb_output_delay(n) and pic_dpb_output_du_delay(n) are the values of pic_dpb_output_delay and pic_dpb_output_du_delay, respectively, specified in the picture timing SEI message associated with access unit n. The variable $t_c$ is derived as follows and is called a clock tick:

$$t_c=\text{num\_units\_in\_tick}\div\text{time\_scale}$$

The variable $t_{c\_sub}$ is derived as follows and is called a sub-picture clock tick:

$$t_{c\_sub}=t_c\div(\text{tick\_divisor\_minus2}+2)$$

According to an example of this disclosure, the output of the current picture is specified as follows:
If PicOutputFlag is equal to 1 and $t_{o,dpb}(n)=t_r(n)$, the current picture is output.
Otherwise, if PicOutputFlag is equal to 0, the current picture is not output, but will be stored in the DPB, as specified by the "bumping" process outlined above.
Otherwise (PicOutputFlag is equal to 1 and $t_{o,dpb}(n)>t_r(n)$), the current picture is output later and will be stored in the DPB (as specified by the "bumping" process) and is output at time $t_{o,dpb}(n)$ unless indicated not to be output by the decoding or inference of no_output_of_prior_pics_flag equal to 1 at a time that precedes $t_{o,dpb}(n)$. When output, the picture shall be cropped, using the conformance cropping window specified in the active sequence parameter set.

When picture n is a picture that is output and is not the last picture of the bitstream that is output, the value of $\Delta t_{o,dpb}(n)$ (i.e., the DPB output time between pictures) is defined as:

$$\Delta t_{o,dpb}(n)=t_{o,dpb}(n_n)-t_{o,dpb}(n)$$

where $n_n$ indicates the picture that follows picture n in output order and has PicOutputFlag equal to 1.

Figure 3:
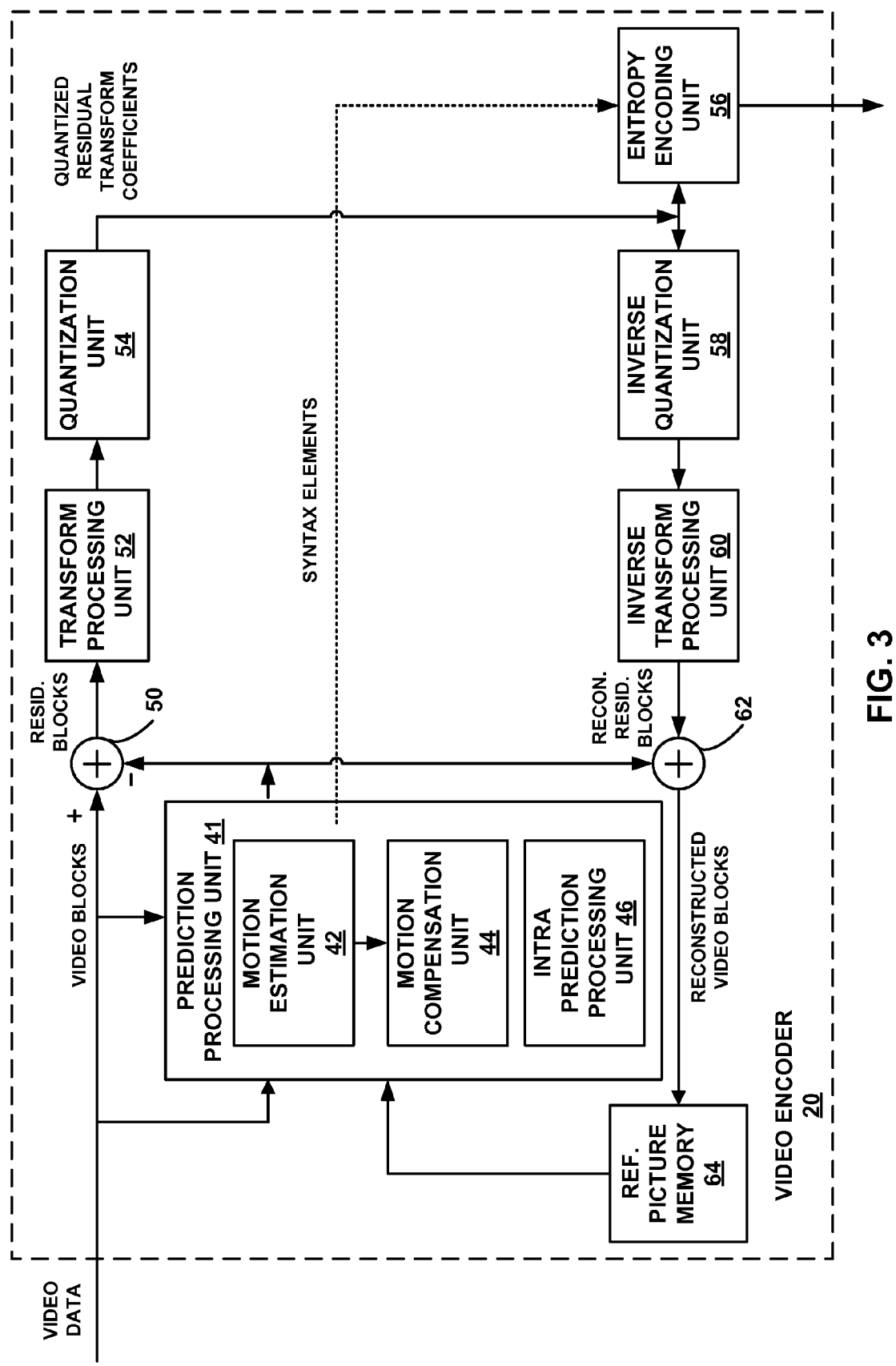
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes prediction processing unit 41, reference picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, video encoder 20 also includes inverse quantization unit 58, inverse transform processing unit 60, and summer 62. A deblocking filter (not shown in FIG. 3) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 3, video encoder 20 receives video data, and prediction processing unit 41 may partition the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64 (also called a decoded picture buffer). The reference block may be used by motion estimation unit 42 and motion compensation unit 44 as a reference block to inter-predict a block in a subsequent video frame or picture.

Video encoder 20 may be configured to implement the techniques of this disclosure. In one example, video encoder 20 may be configured to determine a first DPB output time using a first DPB output delay in the case an HRD setting for a video decoder indicates operation at a picture level, determining a second DPB output time using a second DPB output delay in the case that the HRD setting for the video decoder indicates operation at a sub-picture level, signal the first DPB output delay and the second DPB output delay in an encoded video bitstream. Further examples of the operation of video encoder 20 in accordance with the techniques of this disclosure will be discussed below with reference to FIG. 5.

Figure 4:
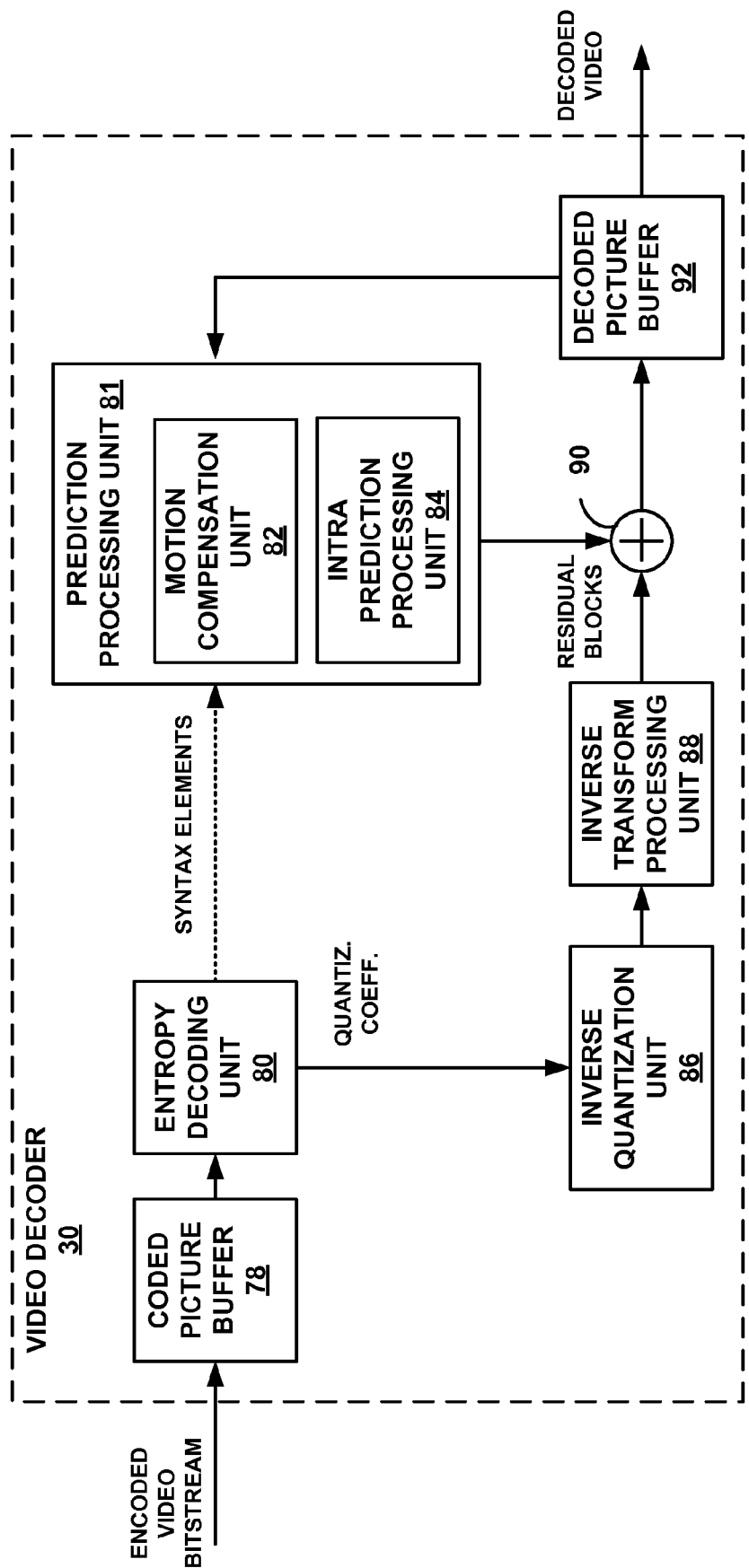
FIG. 4 is a block diagram illustrating an example video decoder that may implement the techniques described in this disclosure.

FIG. 4 is a block diagram illustrating an example video decoder 30 that may implement the techniques described in this disclosure. In the example of FIG. 4, video decoder 30 includes coded picture buffer (CPB) 78, entropy decoding unit 80, prediction processing unit 81, inverse quantization unit 86, inverse transform processing unit 88, summer 90, and decoded picture buffer (DPB) 92. Prediction processing unit 81 includes motion compensation unit 82 and intra-prediction processing unit 84. Video decoder 30 may, in some examples, perform a decoding pass generally reciprocal to the encoding pass described with respect to video encoder 20 from FIG. 3.

CPB 78 stores coded pictures from the encoded picture bitstream. In one example, CPB 78 is a first-in first-out buffer containing access units (AU) in decoding order. An AU is set of network abstraction layer (NAL) units that are associated with each other according to a specified classification rule, are consecutive in decoding order, and contain exactly one coded picture. Decoding order is the order in which pictures are decoded, and may differ from the order in which pictures are displayed (i.e., the display order). The operation of the CPB may be specified by a hypothetical reference decoder (HRD), such as an HRD that operates according to the techniques of this disclosure.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in DPB 92, which stores reference pictures used for subsequent motion compensation. DPB 92 also stores decoded video for later presentation on a display device, such as display device 32 of FIG. 1. Like CPB 78, in one example, the operation of DPB 92 may be specified by the HRD, as defined by the techniques of this disclosure.

Video decoder 30 may be configured to implement the techniques of this disclosure. In one example, video decoder 30 may be configured to receive a first DPB output delay and a second DPB output delay for a decoded picture, determine, for the decoded picture, a first DPB output time using the first DPB output delay in the case an HRD setting for a video decoder indicates operation at a picture level, and determine, for the decoded picture, a second DPB output time using the second DPB output delay in the case that the HRD setting for the video decoder indicates operation at a sub-picture level. Further examples of the operation of video decoder 30 in accordance with the techniques of this disclosure will be discussed below with reference to FIG. 6.

Figure 5:
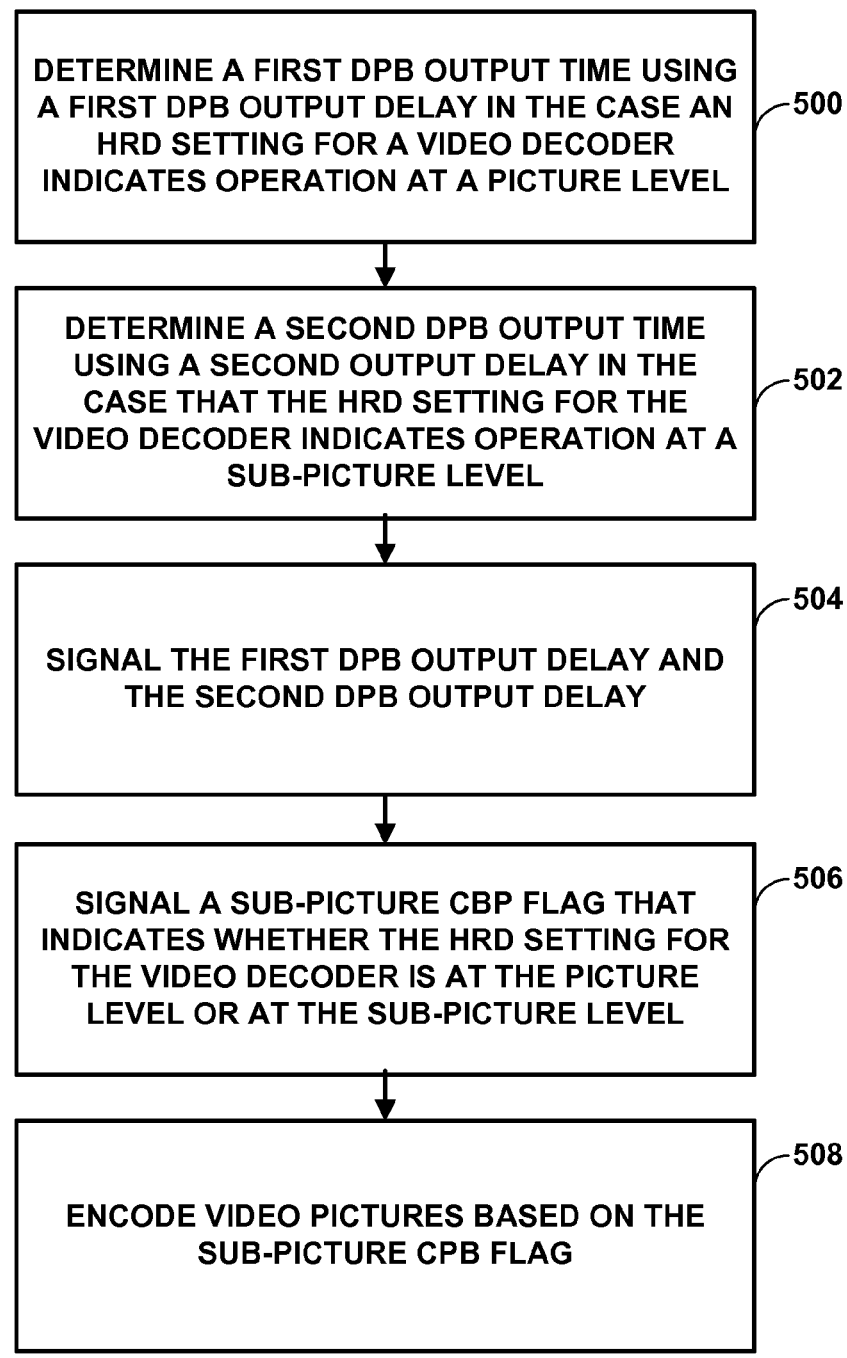
FIG. 5 is a flowchart showing an example encoding method according to the techniques of this disclosure.

FIG. 5 is a flowchart showing an example encoding method according to the techniques of this disclosure. The techniques of FIG. 5 may be implemented by one or more structures of video encoder 20.

In one example, video encoder 20 may be configured to determine a first DPB output time using a first DPB output delay in the case an HRD setting for a video decoder indicates operation at a picture level (500), and determine a second DPB output time using a second DPB output delay in the case that the HRD setting for the video decoder indicates operation at a sub-picture level (502). Video encoder 20 may be further configured to signal the first DPB output delay and the second DPB output delay in an encoded video bitstream (504).

Video encoder 20 may be further configured to signal a sub-picture CPB flag that indicates whether the HRD setting for the video decoder is at the picture level or at the sub-picture level (506), and encode video pictures based on the sub-picture CPB flag (508).

In one example of the disclosure, determining the second DPB output time comprises multiplying the second DPB output delay by a sub-picture clock tick and adding a resultant value to a CPB removal time. In another example of the disclosure, determining the first DPB output time comprises multiplying the first DPB output delay by a clock tick and adding a resultant value to a CPB removal time.

Figure 6:
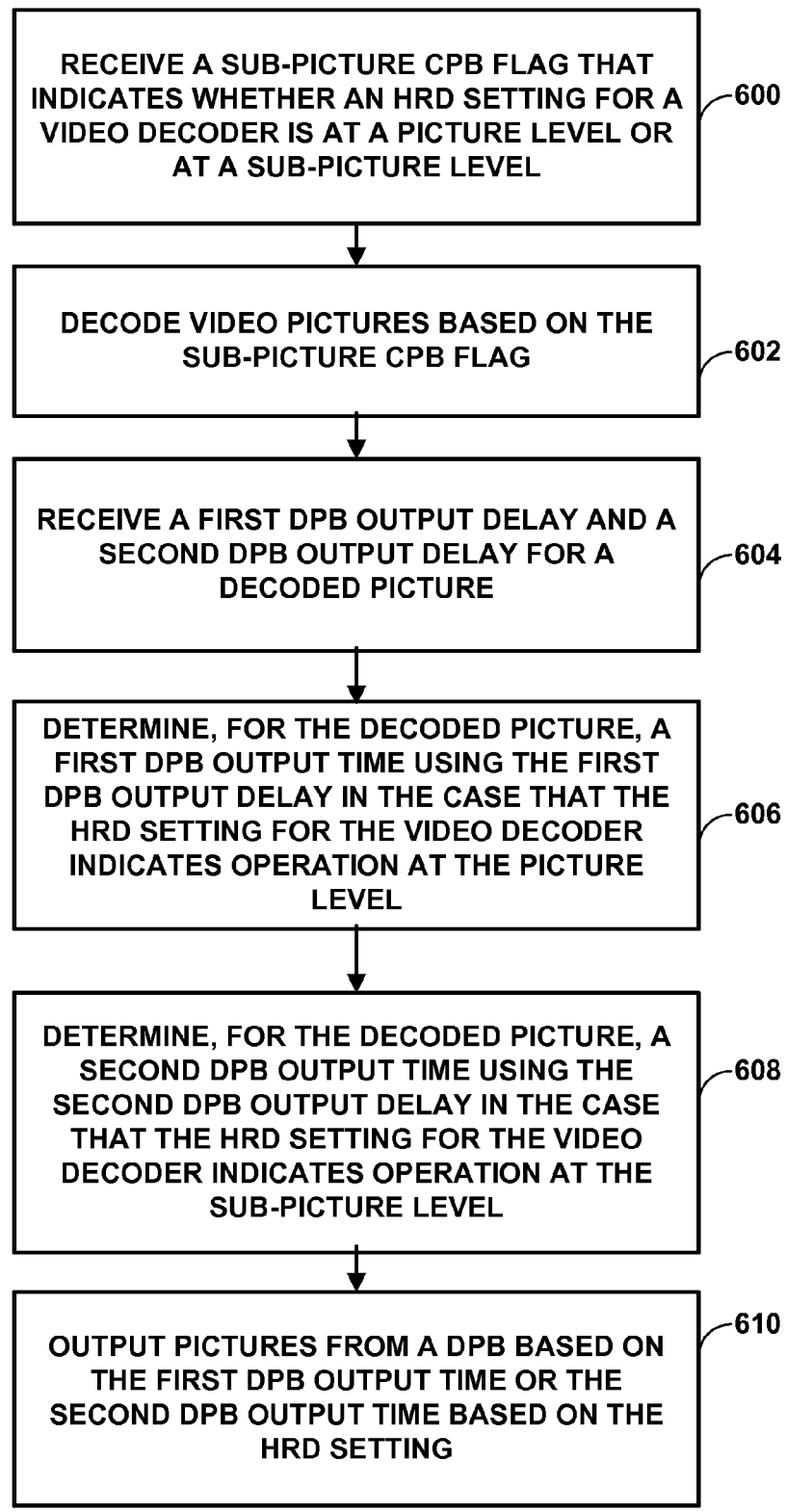
FIG. 6 is a flowchart showing an example decoding method according to the techniques of this disclosure.

FIG. 6 is a flowchart showing an example decoding method according to the techniques of this disclosure. The techniques of FIG. 6 may be implemented by one or more structures of video decoder 30.

In one example, video decoder 30 may be configured to receive a sub-picture CPB flag that indicates whether the HRD setting for the video decoder is at a picture level or at a sub-picture level (600), and decode video pictures based on the sub-picture CPB flag (602).

Video decoder 30 may be further configured to receive a first DPB output delay and a second DPB output delay for a decoded picture (604), and determine, for the decoded picture, a first DPB output time using the first DPB output delay in the case the HRD setting for the video decoder indicates operation at a picture level (606), and determine, for the decoded picture, a second DPB output time using the second DPB output delay in the case that the HRD setting for the video decoder indicates operation at a sub-picture level (608).

Video decoder 30 may be further configured to output pictures from a decoded picture buffer based on the first DPB output time or the second DPB output time based on the HRD setting (610). The first DPB output time is used if the sub-picture CPB flag indicates that the HRD setting for the video decoder indicates operation at the picture level, and the second DPB output time is used if the sub-picture CPB flag indicates that the HRD setting for the video decoder indicates operation at the sub-picture level.

In another example of the disclosure, video decoder 30 is configured to determine the second DPB output time by multiplying the second DPB output delay by a sub-picture clock tick and adding a resultant value to a CPB removal time. In another example of the disclosure, video decoder 30 is configured to determine the first DPB output time by multiplying the first DPB output delay by a clock tick and adding a resultant value to a CPB removal time.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of decoding video, the method comprising:
receiving a first decoded picture buffer (DPB) output delay and a second DPB output delay;
determining whether a hypothetical reference decoder (HRD) operates at an access unit level or operates at a sub-picture level; and
based on a determination that the HRD operates at the access unit level, determining, by a video decoding device, for a decoded picture, a first DPB output time based on the first DPB output delay and a picture clock tick, or
based on a determination that the HRD operates at the sub-picture level:
deriving a sub-picture clock tick based on the picture clock tick and a tick divisor value; and determining, by the video decoding device, for the decoded picture, a second DPB output time based on the second DPB output delay and the sub-picture clock tick.

2. The method of claim 1, further comprising:
processing a sub-picture coded picture buffer (CPB) flag that indicates whether the HRD operates at the access unit level or operates at the sub-picture level; and
outputting the decoded picture from a DPB based on the first DPB output time or the second DPB output time, wherein the decoded picture is output based on the first DPB output time based on the sub-picture CPB flag indicating that the HRD operates at the access unit level, or the decoded picture is output based on the second DPB output time based on the sub-picture CPB flag indicating that the HRD operates at the sub-picture level.

3. The method of claim 1, wherein determining the second DPB output time comprises multiplying the second DPB output delay by a value corresponding to the sub-picture clock tick to obtain a product and adding the product to a CPB removal time.

4. The method of claim 1, wherein determining the first DPB output time comprises multiplying the first DPB output delay by a value corresponding to the picture clock tick to obtain a product and adding the product to a CPB removal time.

5. A method of encoding video, the method comprising:
signaling, in a picture timing supplemental enhancement information (SEI) message associated with an access unit, a first decoded picture buffer (DPB) output delay, the first DPB output delay being indicative of a number of picture clock ticks to wait after removal of a last decoding unit in the access unit from a coded picture buffer (CPB) before a decoded picture is output from a DPB;
signaling a presence of sub-picture level parameters in the bitstream;
signaling a tick divisor value; and
in response to signaling the presence of sub-picture level parameters, signaling, in the picture timing SEI message associated with the access unit a second DPB output delay, the second DPB output delay being indicative of a number of sub-picture clock ticks to wait after removal of the last decoding unit in the access unit from the CPB before the decoded picture is output from the DPB, sub-picture clock ticks being derived based on picture clock ticks.

6. The method of claim 5, further comprising:
determining a first DPB output time, wherein determining the first DPB output time comprises multiplying the first DPB output delay by a value corresponding to the picture clock tick to obtain a product and adding the product to a CPB removal time; and
determining a second DPB output time, wherein determining the second DPB output time comprises multiplying the second DPB output delay by a value corresponding to the sub-picture clock tick to obtain a product and adding the product to a CPB removal time.

7. An apparatus configured to decode video data, the apparatus comprising:
a memory configured to store the video data; and
a video decoder in communication with the memory, the video decoder configured to:
receive a first decoded picture buffer (DPB) output delay and a second DPB output delay;
determine whether a hypothetical reference decoder (HRD) operates at an access unit level or operates at a sub-picture level; and
based on a determination that the HRD operates at the access unit level, determine, for a decoded picture, a first DPB output time based on the first DPB output delay and a picture clock tick, and
based on a determination that the HRD operates at the sub-picture level:
derive a sub-picture clock tick based on the picture clock tick and a tick divisor value; and
determine, for the decoded picture, a second DPB output time based on the second DPB output delay and the sub-picture clock tick.

8. The apparatus of claim 7, wherein the video decoder is further configured to:
process a sub-picture coded picture buffer (CPB) flag that indicates whether the HRD operates at the access unit level or operates at the sub-picture level; and
output the decoded picture from a DPB based on the first DPB output time or the second DPB output time, wherein the decoded picture is output based on the first DPB output time based on the sub-picture CPB flag indicating that the HRD operates at the access unit level, or the decoded picture is output based on the second DPB output time based on the sub-picture CPB flag indicating that the HRD operates at the sub-picture level.

9. The apparatus of claim 7, wherein the video decoder is configured to determine the second DPB output time by multiplying the second DPB output delay by a value corresponding to the sub-picture clock tick to obtain a product and adding the product to a CPB removal time.

10. The apparatus of claim 7, wherein the video decoder is configured to determine the first DPB output time by multiplying the first DPB output delay by a value corresponding to the picture clock tick to obtain a product and adding the product to a CPB removal time.

11. An apparatus configured to encode video data, the apparatus comprising:
a memory configured to store the video data; and
a video encoder in communication with the memory, the video encoder configured to:
signal, in a picture timing supplemental enhancement information (SEI) message associated with an access unit, a first decoded picture buffer (DPB) output time delay, the first DPB output delay being indicative of a number of picture clock ticks to wait after removal of a last decoding unit in the access unit from a coded picture buffer (CPB) before a decoded picture is output from a DPB;
signal a presence of sub-picture level parameters in the bitstream;
signal a tick divisor value; and
in response to signaling the presence of sub-picture level parameters, signal, in the picture timing SEI message associated with the access unit, a second DPB output delay, the second DPB output delay being indicative of a number of sub-picture clock ticks to wait after removal of the last decoding unit in the access unit from the CPB before the decoded picture is output from the DPB, sub-picture clock ticks being derived based on picture clock ticks.

12. The apparatus of claim 11, wherein the video encoder is further configured to:
determine the first DPB output time by multiplying the first DPB output delay by a value corresponding to the picture clock tick to obtain a first DPB output product and adding the first DPB output product to a CPB removal time; and determine the second DPB output time by multiplying the second DPB output delay by a value corresponding to the sub-picture clock tick to obtain a second DPB output product and adding the second DPB output product to a CPB removal time.

13. An apparatus configured to decode video data, the apparatus comprising:

means for receiving a first decoded picture buffer (DPB) output delay and a second DPB output delay;

indication means for determining whether a hypothetical reference decoder (HRD) operates at an access unit level or operates at a sub-picture level;

means, operable when the indication means determines operation of the HRD at the access unit level, for determining, for a decoded picture, a first DPB output time based on the first DPB output delay and a picture clock tick;

means for deriving a sub-picture clock tick based on the picture clock tick and a tick divisor value; and means, operable when the indication means determines operation of the HRD at the sub-picture level, for determining, for the decoded picture, a second DPB output time based on the second DPB output delay and the sub-picture clock tick.

14. The apparatus of claim 13, further comprising:

means for processing a sub-picture coded picture buffer (CPB) flag that indicates whether the HRD operates at the access unit level or operates at the sub-picture level; and means for outputting the decoded picture from a DPB based on the first DPB output time or the second DPB output time, wherein the decoded picture is output based on the first DPB output time based on the sub-picture CPB flag indicating that the HRD operates at the access unit level, or the decoded picture is output based on the second DPB output time based on the sub-picture CPB flag indicating that the HRD operates at the sub-picture level.

15. The apparatus of claim 13, wherein the means for determining the second DPB output time comprises means for multiplying the second DPB output delay by a value corresponding to the sub-picture clock tick to obtain a product and adding the product to a CPB removal time.

16. The apparatus of claim 13, wherein the means for determining the first DPB output time comprises means for multiplying the first DPB output delay by a value corresponding to the picture clock tick to obtain a product and adding the product to a CPB removal time.

17. An apparatus configured to encode video data, the apparatus comprising:

means, for signaling, in a picture timing supplemental enhancement information (SEI) message associated with an access unit, a first decoded picture buffer (DPB) output delay, the first DPB output delay being indicative of a number of picture clock ticks to wait after removal of a last decoding unit in the access unit from a coded picture buffer (CPB) before a decoded picture is output from a DPB;

means for signaling a presence of sub-picture level parameters in the bitstream;

means for signaling a tick divisor value;

means, operable in response to signaling the presence of sub-picture level parameters, for signaling, in the picture timing SEI message associated with the access unit, a second DPB output delay, the second DPB output delay being indicative of a number of sub-picture clock ticks to wait after removal of the last decoding unit in the access unit from the CPB before the decoded picture is output from the DPB, sub-picture clock ticks being derived based on picture clock ticks.

18. The apparatus of claim 17, wherein the means for determining the first DPB output time comprises means for multiplying the first DPB output delay by a value corresponding to the picture clock tick to obtain a first DPB output product and adding the first DPB output product to a CPB removal time; and wherein the means for determining the second DPB output time comprises means for multiplying the second DPB output delay by a value corresponding to the sub-picture clock tick to obtain a second DPB output product and adding the second DPB output product to a CPB removal time.

19. A non-transitory computer-readable storage medium storing instructions that, when executed, causes one or more processors of a device configured to decode video data to:

receive a first decoded picture buffer (DPB) output delay and a second DPB output delay;

determine whether a hypothetical reference decoder (HRD) operates at an access unit level or operates at a sub-picture level; and based on a determination that the HRD operates at the access unit level, determine, for a decoded picture, a first DPB output time based on the first DPB output delay and a picture clock tick; and based on a determination that the HRD operates at the sub-picture level:

derive a sub-picture clock tick based on the picture clock tick and a tick divisor value; and determine, for the decoded picture, a second DPB output time based on the second DPB output delay and the sub-picture clock tick.

20. The non-transitory computer-readable storage medium of claim 19, wherein the instructions further cause the one or more processors to:

process a sub-picture coded picture buffer (CPB) flag that indicates whether the HRD operates at the access unit level or operates at the sub-picture level; and output the decoded picture from a DPB based on the first DPB output time or the second DPB output time, wherein the decoded picture is output based on the first DPB output time based on the sub-picture CPB flag indicating that the HRD operates at the access unit level, or the decoded picture is output based on the second DPB output time based on the sub-picture CPB flag indicating that the HRD operates at the sub-picture level.

21. The non-transitory computer-readable storage medium of claim 19, wherein the instructions further cause the one or more processors to multiply the second DPB output delay by a value corresponding to the sub-picture clock tick to obtain a product and add the product to a CPB removal time.

22. The non-transitory computer-readable storage medium of claim 19, wherein the instructions further cause the one or more processors to multiply the first DPB output delay by a value corresponding to the picture clock tick to obtain a product and add the product to a CPB removal time.

23. A non-transitory computer-readable storage medium storing instructions that, when executed, causes one or more processors of a device configured to encode video data to:

signal, in a picture timing supplemental enhancement information (SEI) message associated with an access unit, a first decoded picture buffer (DPB) output time delay, the first DPB output delay being indicative of a number of picture clock ticks to wait after removal of a last decoding unit in the access unit from a coded picture buffer (CPB) before a decoded picture is output from a DPB;

signal a presence of sub-picture level parameters in the bitstream;

signal a tick divisor value; and in response to signaling the presence of sub-picture level parameters, signal, in the picture timing SEI message associated with the access unit, a second DPB output delay, the second DPB output delay being indicative of a number of sub-picture clock ticks to wait after removal of the last decoding unit in the access unit from the CPB before the decoded picture is output from the DPB, sub-picture clock ticks being derived based on picture clock ticks.

24. The non-transitory computer-readable storage medium of claim 23, wherein the instructions further include instructions that, when executed, cause the one or more processors to determine the first DPB output time by multiplying the first DPB output delay by a value corresponding to the picture clock tick to obtain a first DPB output product and adding the first DPB output product to a CPB removal time; and wherein the instructions further include instructions that, when executed, cause the one or more processors to determine the second DPB output time by multiplying the second DPB output delay by a value corresponding to the sub-picture clock tick to obtain a second DPB output product and adding the second DPB output product to a CPB removal time.

\* \* \* \* \*